J. F. BASSETT & J. NICHOLS.
Shingle-Block Sappers and Bolters.
No. 155,850.  Patented Oct. 13, 1874.
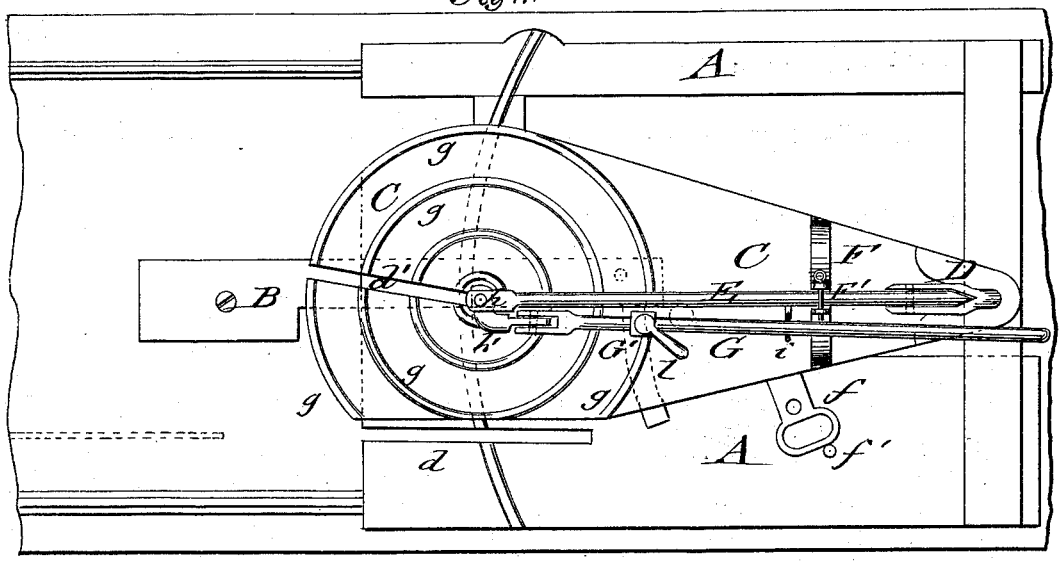
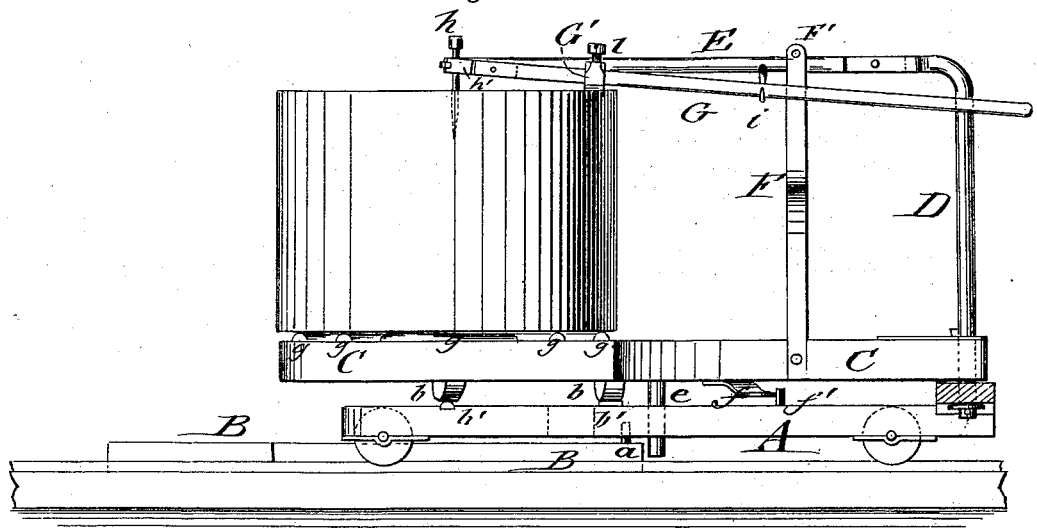
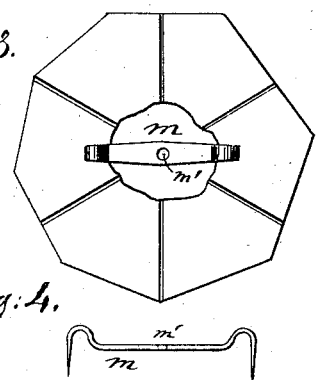
WITNESSES:  INVENTOR:

UNITED STATES PATENT OFFICE.

JOHN F. BASSETT AND JAMES NICHOLS, OF LIMESTONE, NEW YORK.

IMPROVEMENT IN SHINGLE-BLOCK SAPPERS AND BOLTERS.

Specification forming part of Letters Patent No. 155,850, dated October 13, 1874; application filed June 6, 1874.

*To all whom it may concern:*

Be it known that we, JOHN F. BASSETT and JAMES NICHOLS, of Limestone, in the county of Cattaraugus and State of New York, have invented a new and Improved Shingle-Block Sapper and Bolter, of which the following is a specification:

In the accompanying drawing, Figure 1 represents a top view of our improved apparatus for sapping and bolting shingle-blocks; Fig. 2, a side elevation of the same, and Figs. 3 and 4 detail top and side views of the fastening-dog used for blocks with rotten or decayed cores.

Similar letters of reference indicate corresponding parts.

Our invention relates to an improved apparatus for sapping and bolting blocks preparatory to cutting them into shingles, which is constructed in such a manner that the log is readily turned and fed to the saw without removing the same during the different operations. The cutting up of the block into the shingle-blocks of the required size is rapidly, easily, and accurately accomplished, so as to form a time and labor saving device for saw-mills.

Our invention consists of a sector-shaped table pivoted to and moving by friction-rollers on a truck of the usual construction. The table is provided with raised concentric rings for turning readily the block to be cut thereon, and also with a slot and segmentally-cut-off side part corresponding with a saw-recess of the truck. A stop-pin at the bottom of the pivoted table and a spring-latch, define, in connection with a check-block and stop-pin on the floor, the position of the table toward the saw. A pivoted arm with center pin swings in a standard of the table, and is applied to the block or a center dog fastened to the same. A pivoted hand-lever with adjustable dog swings on the center pin of the arm, and serves to adjust the block for sapping and bolting.

In the drawing, A represents the truck, to which the sapping and bolting apparatus is applied. The truck is constructed in the usual manner, and is running on a track of the mill-floor. A check-block, B, is attached to the floor between the track, being recessed at one side thereof, and provided with a stop-pin, $a$, at the rear part thereof, for defining, in connection with the lateral pieces of truck A, the extent of forward and return motion of the same. The sector-shaped table C is pivoted to the rear part of the truck, and runs by friction-rollers $b$ at its front part readily on curved tracks $b'$. The truck A is provided with a slotted recess, $d$, in the line of the saw, table C having also a corresponding slot, $d'$, and a segmental part cut off at that side facing the saw. A strong downward-projecting bolt, $e$, of table C slides either along the recessed side of the check-block B, so as to define thereby the forward motion of the table against the saw when the same enters the slot of the table, which is in this position furthermore secured by a spring-latch, $f$, with handle locking over a pin, $f'$, of the truck, or the pin or bolt $e$ slides along the outer side of the check-bolt, and guides thereby the straight side part of the table and block in accurate position against the saw for sapping. The upper wider part of the table C has raised concentric metal bands or strips $g$, on which the block is placed and readily turned around its axis without changing its central position on the rings. A vertical standard, D, which serves, preferably, also as the pivot-pin of the table, is provided at its upper curved and forked end with a pivoted arm, E, which swings readily from a vertical position into a horizontal longitudinal one, and is supported and retained in the latter by a brace, F, and fastening-pin F'. The center pin $h$ is applied to the front end of arm E, and serves at the same time as pivot for the curved piece $h'$, to which the hand-lever G is pivoted, so that the same may be swung freely in lateral and vertical direction. The hand-lever G may be placed into a supporting-hook, $i$, of arm E, when not in use, and swung up out of the way with the same for placing the block on the table. A sliding dog, G', with sharp cutting-edge is readily adjusted on lever G by a thumb-screw or crank, $l$, for the purpose of biting into the top part of the block, and turning the same by means of the lever, as required, for the sapping and bolting operations. The lever-pin $h$ is applied either directly to the center of the block, if the same is sound, or if its core is rotten, to a dog, $m$, with central perforation $m'$, Figs. 3 and 4, which is attached diametrically across the rotten or decayed part of the block.

After the block is adjusted on table C and fastened by the center pin, the table is swung sidewise to the saw until the thickness of the part to be sapped corresponds with the line of the saw; the block is then fed up for cutting, gigged back, and then fed by turning with the hand-lever for another sap, and so on until the whole circumference of the block is sapped. The table is then swung over until the center of the block and the slot of the table are in line with the saw, and the spring-latch locks over the pin of the truck. The block is then fed to the saw for bolting, gigged back, turned by the hand-lever, fed up again to the saw until the whole block is quartered or bolted.

The operation of sapping and bolting is by means of the devices for setting the table in position, and the hand-lever fully within the control of the attendant, and admits, therefore, of an expeditious and economical working of the apparatus.

Having thus described our invention, what we claim as new, and desire to secure by Letters Patent, is—

1. The combination of truck A and pivoted table C, having bottom pin $e$, with the recessed check-block B provided with stop-pin $a$ for defining extent of motion of truck and position of table, substantially as set forth.

2. The pivoted table C having spring-latch $f$, in combination with truck A having pin $f'$, for locking the table in position for bolting with the slots of table and truck in line with the saw, as described.

3. The sector-shaped table C, provided with concentric block-supporting strips $g$, slot $d'$, and segmentally-straightened side-facing saw, as specified.

4. The pivoted and braced arm E of table C, having center pin $h$ and diametrical dog $m$, in combination with the pivoted hand-lever G jointed thereto, and provided with an adjustable dog, G', for turning the block readily around its central axis for exposing the same to the saw for sapping and bolting, substantially in the manner and for the purpose set forth.

JOHN F. BASSETT.
JAMES NICHOLS.

Witnesses:
E. E. HERRICK,
R. E. FULLER.